(No Model.)
L. J. BRISTOL.
WHIFFLETREE SNAP.
No. 381,325. Patented Apr. 17, 1888.
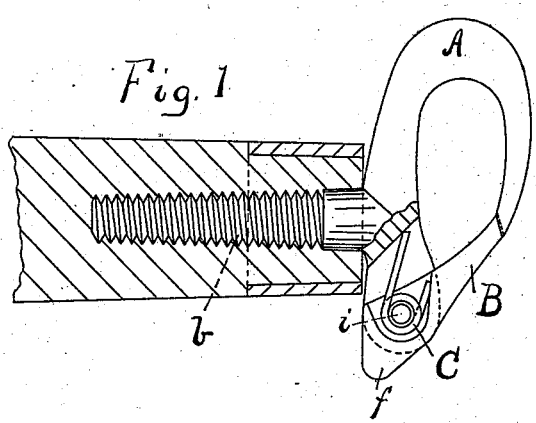
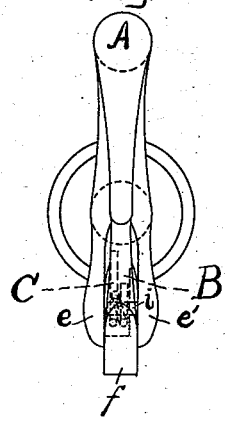
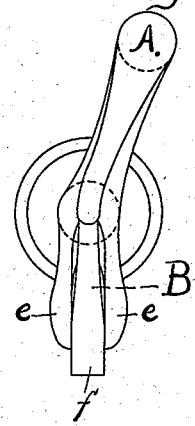
WITNESSES:
Geo. E. Greenleaf
L. W. Clearland
INVENTOR
Lambert J. Bristol,
BY Julius Twiss,
ATTORNEY

UNITED STATES PATENT OFFICE.

LAMBERT J. BRISTOL, OF NEW HAVEN, CONNECTICUT.

WHIFFLETREE-SNAP.

SPECIFICATION forming part of Letters Patent No. 381,325, dated April 17, 1888.

Application filed January 14, 1888. Serial No. 260,782. (No model.)

*To all whom it may concern:*

Be it known that I, LAMBERT J. BRISTOL, a citizen of the United States, residing in the town of New Haven and State of Connecticut, have invented new and useful Improvements in Whiffletree-Snaps, of which the following is a specification.

My invention relates to improvements in whiffletree-snaps, and has for its object to provide an efficient means of securely fastening and holding the traces and permitting them to be readily attached and detached when desired.

The improvement consists in providing a hook with a movable tongue turning on a pin near one end of the hook, a coiled spring surrounding the pin and adapted to keep the tongue in contact with the hook, and a threaded shank for holding the snap securely in the end of the whiffletree.

In the accompanying drawings, Figure 1 is a plan view of my improved whiffletree-snap, with a part of one side broken away to show the tongue and coiled spring. Fig. 2 is an end view of the same. Fig. 3 shows an end view of a modification of my improved snap, and Fig. 4 is a separate view of the tongue.

Referring to the drawings, A denotes the body of the hook. B indicates the tongue of the same, and C refers to the coiled spring for operating the tongue.

The hook A is provided with a shank, $b$, integral with and projecting from the side of the hook near the center of its length. This shank is preferably threaded, so that it may be more firmly held in place by screwing it into the end of the whiffletree; but the shank may be made plain and driven into the end. The rear end of the hook is formed into suitable ears, $e$ $e'$, one of which, $e$, is cast at a slight angle with the other, leaving a space between that ear and the end of the pin $i$, which is cast on the inner side of the opposite ear, $e'$. After placing the tongue B and spring C on the pin $i$, the ear $e$ is closed down on the end of the pin, which is a safe and cheap method of connecting the tongue and hook. The tongue is thus pivoted on the pin $i$ and between the ears $e$ $e'$. A cavity is made in the tongue for the reception of the coiled spring C. This spring surrounds a portion of the length of the pin $i$, and is provided with projecting ends, one of which bears against the body of the hook and the other end against the side of the tongue to keep its forward end in contact with the rear end of the hook when the tongue is in its normal position. A projection, $f$, is formed on the rear end of the tongue, by means of which it can be easily thrown back from the hook by the finger when it is desired to unhook the trace. The projection, however, may be omitted without impairing the efficiency of the hook. The body of the hook may be formed on the shank at an angle with the ears which carry the tongue, as shown in Fig. 3, so that the end of the trace which projects backward when the trace is attached to the hook will pass over the tongue without being bent.

The advantages of my improved snap are that the trace can be readily attached to the hook and detached therefrom, that the trace when attached is more securely fastened than by the ordinary means, and that the snap can be manufactured much cheaper than other whiffletree snaps which serve the same purpose.

I claim as new and desire to secure by Letters Patent—

1. As a new article of manufacture, a whiffletree-snap consisting of a hook provided with ears $e$ $e'$, a tongue pivoted between the ears on a pin projecting inwardly from one of the ears and having a cavity inclosing the spring, a spiral spring surrounding a portion of the pin, on which the tongue turns, bearing at one end against the tongue and at the other end against the body of the hook, and a shank adapted to be driven or screwed into the end of the whiffletree, substantially as described.

2. In a whiffletree-snap, a hook formed on the shank in a plane at an angle with the plane of the ears which carry the tongue, whereby the backward-projecting end of the trace is permitted to pass the tongue without being bent, substantially as described.

LAMBERT J. BRISTOL.

Witnesses:
JULIUS TWISS,
GEO. E. GREENLEAF.